US010742627B2

(12) United States Patent
Li

(10) Patent No.: US 10,742,627 B2
(45) Date of Patent: Aug. 11, 2020

(54) SYSTEM AND METHOD FOR DYNAMIC NETWORK DATA VALIDATION

(71) Applicant: DatingSphere Inc., Irvine, CA (US)

(72) Inventor: Ming J. Li, Santa Ana, CA (US)

(73) Assignee: DATINGSPHERE INC., Irvine, CA (US)

( * ) Notice: Subject to any disclaimer, the term of this patent is extended or adjusted under 35 U.S.C. 154(b) by 352 days.

(21) Appl. No.: 15/133,159

(22) Filed: Apr. 19, 2016

(65) Prior Publication Data

US 2016/0315944 A1  Oct. 27, 2016

Related U.S. Application Data

(60) Provisional application No. 62/151,007, filed on Apr. 22, 2015.

(51) Int. Cl.
| | |
|---|---|
| *H04L 29/06* | (2006.01) |
| *G06Q 50/00* | (2012.01) |
| *G06F 16/9535* | (2019.01) |
| *H04L 29/08* | (2006.01) |

(52) U.S. Cl.
CPC .......... *H04L 63/08* (2013.01); *G06F 16/9535* (2019.01); *G06Q 50/01* (2013.01); *H04L 63/102* (2013.01); *H04L 67/306* (2013.01)

(58) Field of Classification Search
CPC .................................. H04L 63/00; G06F 9/00
See application file for complete search history.

(56) References Cited

U.S. PATENT DOCUMENTS

| | | | |
|---|---|---|---|
| 9,754,040 B2 * | 9/2017 | Saha | G06F 17/3089 |
| 2005/0198247 A1 * | 9/2005 | Perry | H04L 7/0008 |
| | | | 709/223 |

* cited by examiner

*Primary Examiner* — Joseph P Hirl
*Assistant Examiner* — Leynna Truvan
(74) *Attorney, Agent, or Firm* — Kwan & Olynick LLP

(57) ABSTRACT

In general, certain embodiments of the present disclosure provide systems and methods for dynamic network data validation. In various embodiments, a system is provided comprising a content server configured to store network profile information as a deserialized data structure. A first client device, corresponding to a first user, is configured to transmit one or more data packets to the content server, including identifying information of a second user. A dispatch server is configured to transmit a call to action item to a second client device corresponding to the second user. An organizational database is configured to provide a unique identifier to authenticate the second user. The content server is further configured to, upon authentication of the second user, authorize the second client device to access the network profile information to receive validation information corresponding to the network profile information. The network profile information is updated by the validation information.

20 Claims, 8 Drawing Sheets

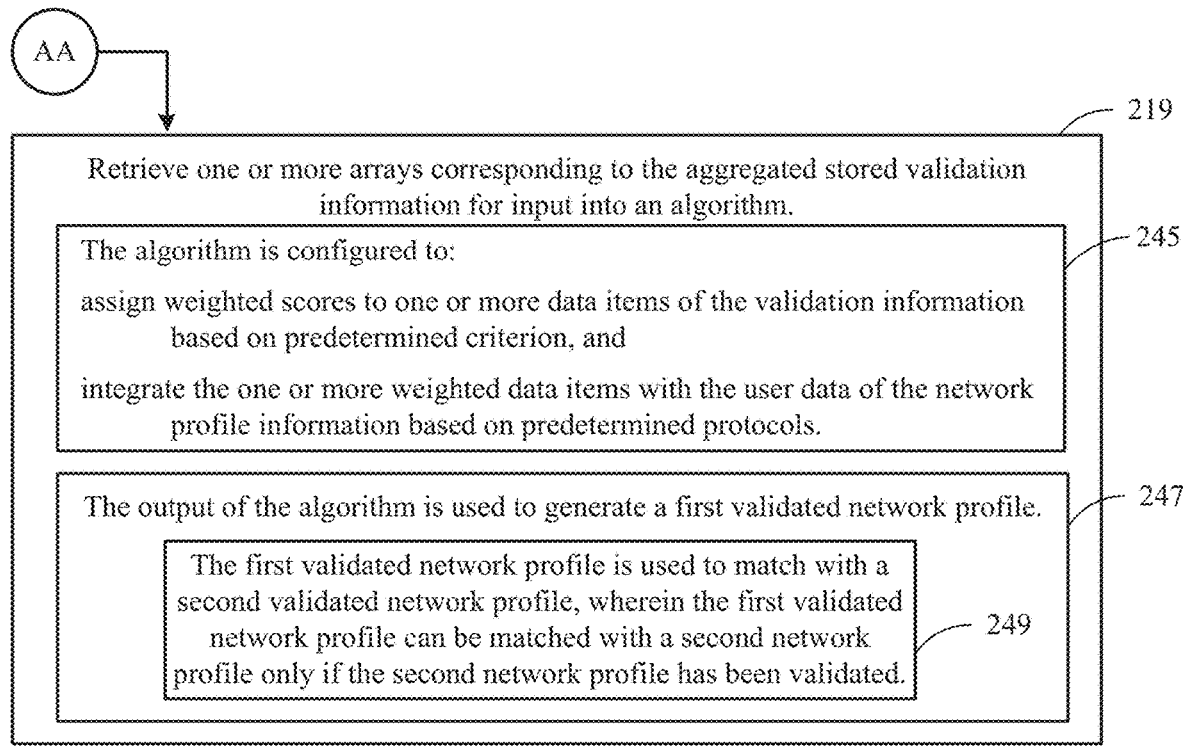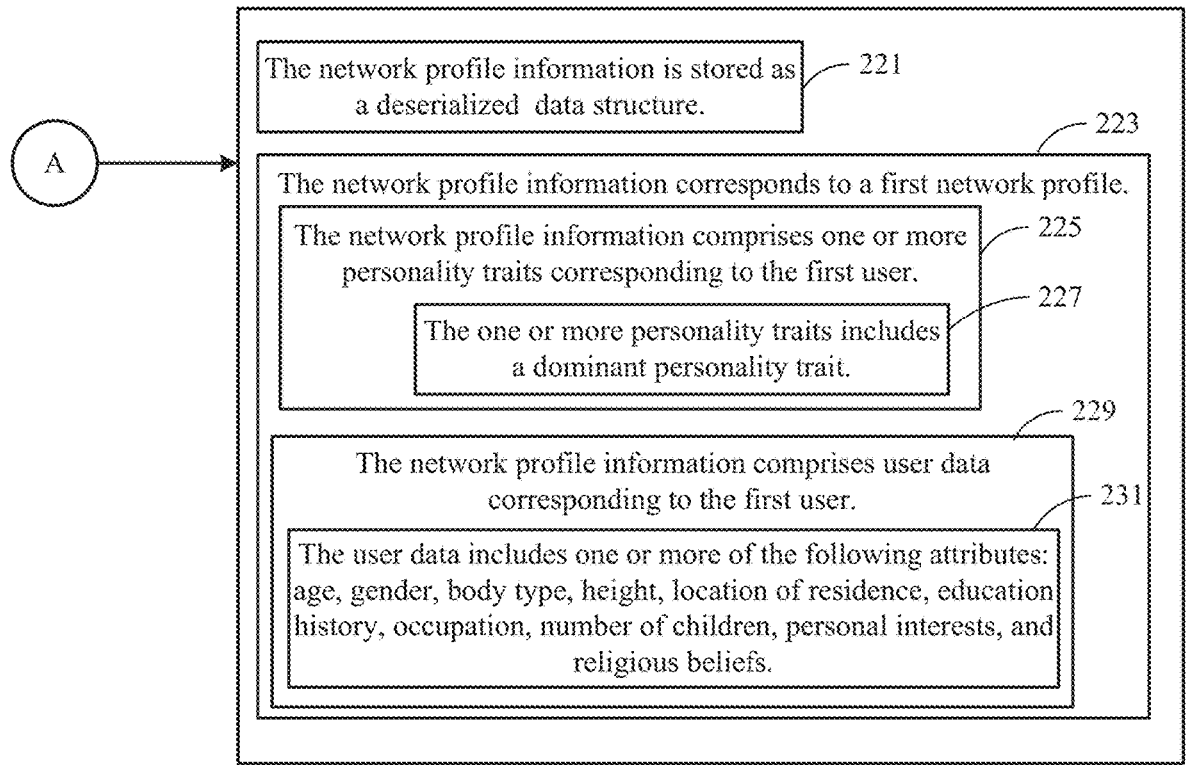
FIG. 2B

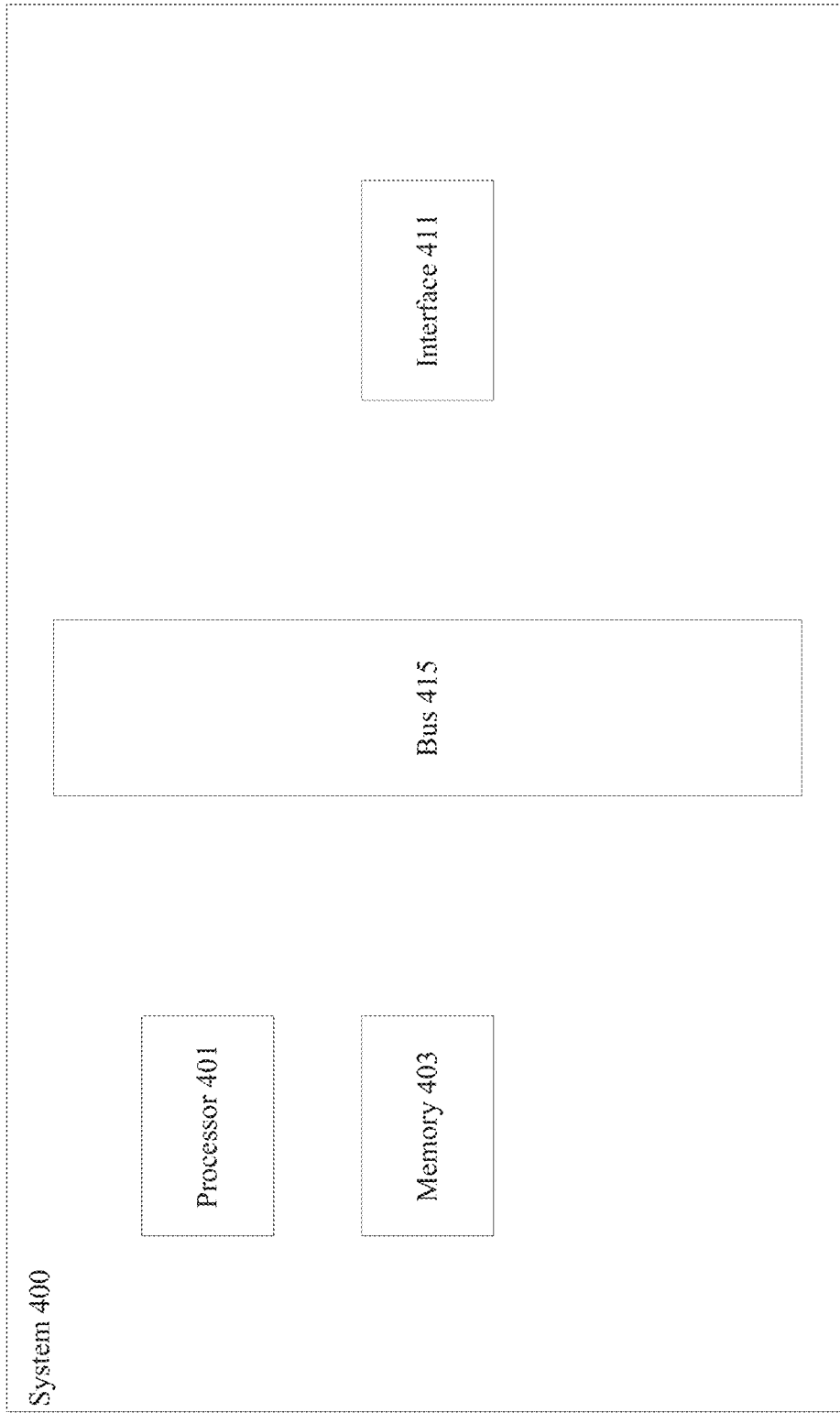

US 10,742,627 B2

SYSTEM AND METHOD FOR DYNAMIC NETWORK DATA VALIDATION

CROSS-REFERENCE TO RELATED APPLICATIONS

This application claims the benefit of prior application U.S. Provisional Application No. 62/151,007, filed Apr. 22, 2015, titled "REVIEW BASED ONLINE DATING VALIDATION AND MATCHING METHOD" by Ming J. Li, which application is herein incorporated by reference in its entirety for all purposes.

TECHNICAL FIELD

The present disclosure relates generally to network data exchange, and more specifically to integrating updated data points.

BACKGROUND

The amount of data and information on the Internet has increased exponentially over the past decade. Since 2011, the overall global population of people using the internet has grown 60 percent, from 2 Billion internet users to more than 3.2 billion people in 2015. By the date of the present disclosure, it has been estimated that about 2.5 Quintillion bytes of data are created on the Internet every day, as the Internet continues to expand and more people are given the opportunity to access the Internet.

With such increased access to massive amounts of data being generated, it is increasingly more difficult to ascertain true and correct information from false information because there are few safeguards in place to ensure that correct data is retrieved by users. Furthermore, there are no reliable and transparent procedures to validate the massive amounts of information located on the Internet. Thus, there is a need for an enhanced system and method to dynamically validate network information and update such information with validated information.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, certain embodiments of the present disclosure provide techniques or mechanisms for dynamic network data validation. According to various embodiments, a system is provided comprising a content server including a processor and memory. In some embodiments the content server is configured to store network profile information corresponding to a first network profile. In some embodiments, the network profile information is stored as a deserialized data structure in the content server. In some embodiments, the network profile information comprises one or more personality traits corresponding to the first user. In some embodiments, the one or more personality traits include a dominant personality trait. In some embodiments, the network profile information further includes user data corresponding to the first user. In some embodiments, the user data includes one or more of the following attributes: age, gender, body type, height, location of residence, education history, occupation, number of children, personal interests, and religious beliefs.

The system further comprises a first client device corresponding to a first user. In some embodiments, the first client device is configured to transmit one or more data packets to the content server over a network, wherein the one or more data packets include identifying information of a second user. The system further comprises a dispatch server including a processor and memory. In some embodiments, the dispatch server is configured to transmit a call to action item in response to a transmission request from the content server. In some embodiments, the content server generates the transmission request upon receiving the one or more data packets. The system further comprises a second client device corresponding to the second user and configured to receive the call to action item. The system further comprises an organizational database configured to provide a unique identifier corresponding to the second user in response to activation of the call to action item by the second client device. In some embodiments, the unique identifier is used to authenticate the second user.

In some embodiments, the content server is further configured to, upon authentication of the second user, authorize the second client device to access the network profile information, and receive validation information corresponding to the network profile information from the second client device. In some embodiments, the validation information includes one or more of the following data items: an image including the first user and the second user, a relationship type between the first user and the second user, a length of the relationship type between the first user and the second user, one or more personality traits corresponding to the first user including a dominant personality trait, a narration relating to the first user, and a verification of the user data corresponding to the first user. In some embodiments, the dispatch server is further configured to transmit a review confirmation to the first client device upon receiving a receipt packet. In some embodiments, the content server generates the receipt packet upon receiving the validation information. In some embodiments, the content server is further configured to store the validation information in an array of the deserialized data structure in the content server. In some embodiments, the content server is further configured to update the deserialized data structure. In some embodiments, updating the deserialized data structure includes aggregating the stored validation information from the second client device with other stored validation information received from a plurality of other client devices.

In some embodiments, the content server is further configured to retrieve one or more arrays corresponding to the aggregated stored validation information for input into an algorithm. In some embodiments, the algorithm is configured to assign weighted scores to one or more data items of the validation information based on predetermined criterion. In some embodiments, the algorithm is further configured to integrate the one or more weighted data items with the user data of the network profile information based on predetermined protocols. In some embodiments, the output of the algorithm is used to generate a first validated network profile. In some embodiments, the first validated network profile is used to match with a second validated network profile. In some embodiments, the first validated network profile can be matched with a second network profile only if the second network profile has been validated.

Other implementations of this disclosure include corresponding devices, methods, and computer programs, configured to perform the actions of the described system. In yet further implementations, a non-transitory computer readable medium is provided comprising one or more programs configured for execution by a computer system. In some embodiments, the one or more programs include instructions for performing the actions of described systems and methods. These other implementations may each optionally include one or more of the following features.

For instance, a method for dynamic network data validation is provided. In some embodiments, the method comprises storing network profile information as a deserialized data structure in a content server including a processor and memory. In some embodiments, the network profile information corresponds to a first network profile. The method further comprises receiving one or more data packets at the content server. In some embodiments, the one or more data packets include identifying information of a second user and are transmitted over a network by a first client device corresponding to a first user. The method further comprises transmitting a call to action item from a dispatch server to a second client device corresponding to the second user. In some embodiments, the dispatch server includes a processor and memory, and is configured to transmit the call to action item upon receiving a transmission request generated by the content server upon receiving the one or more data packets.

The method further comprises authenticating the second user by the content server upon activation of the call to action item by the second device. In some embodiments, the second user is authenticated with a unique identifier corresponding to the second user retrieved from an organizational database. The method further comprises authorizing the second client device to access the network profile information, and receiving validation information corresponding to the network profile information from the second device. The method further comprises storing the validation information in an array of the deserialized data structure in the content server. The method further comprises updating the deserialized data structure. In some embodiments, updating the deserialized data structure includes aggregating the stored validation information from the second client device with other stored validation information received from a plurality of other client devices.

In some embodiments, the method further comprises transmitting a review confirmation from the dispatch server to the first client device. In some embodiments, the dispatch server is further configured to transmit the review confirmation upon receiving a receipt packet generated by the content server upon receiving the validation information. In some embodiments, the method further comprises retrieving one or more arrays corresponding to the aggregated stored validation information for input into an algorithm. In some embodiments, the output of the algorithm is used to generate a first validated network profile.

BRIEF DESCRIPTION OF THE DRAWINGS

The disclosure may best be understood by reference to the following description taken in conjunction with the accompanying drawings, which illustrate particular embodiments of the present disclosure.

FIGS. 2A, 2B, and 2C illustrate a method for dynamic network data validation, in accordance with one or more embodiments.

FIG. 4 illustrates one example of a system capable of implementing various processes described in the present disclosure, in accordance with one or more embodiments.

DETAILED DESCRIPTION OF PARTICULAR EMBODIMENTS

Figure 1:
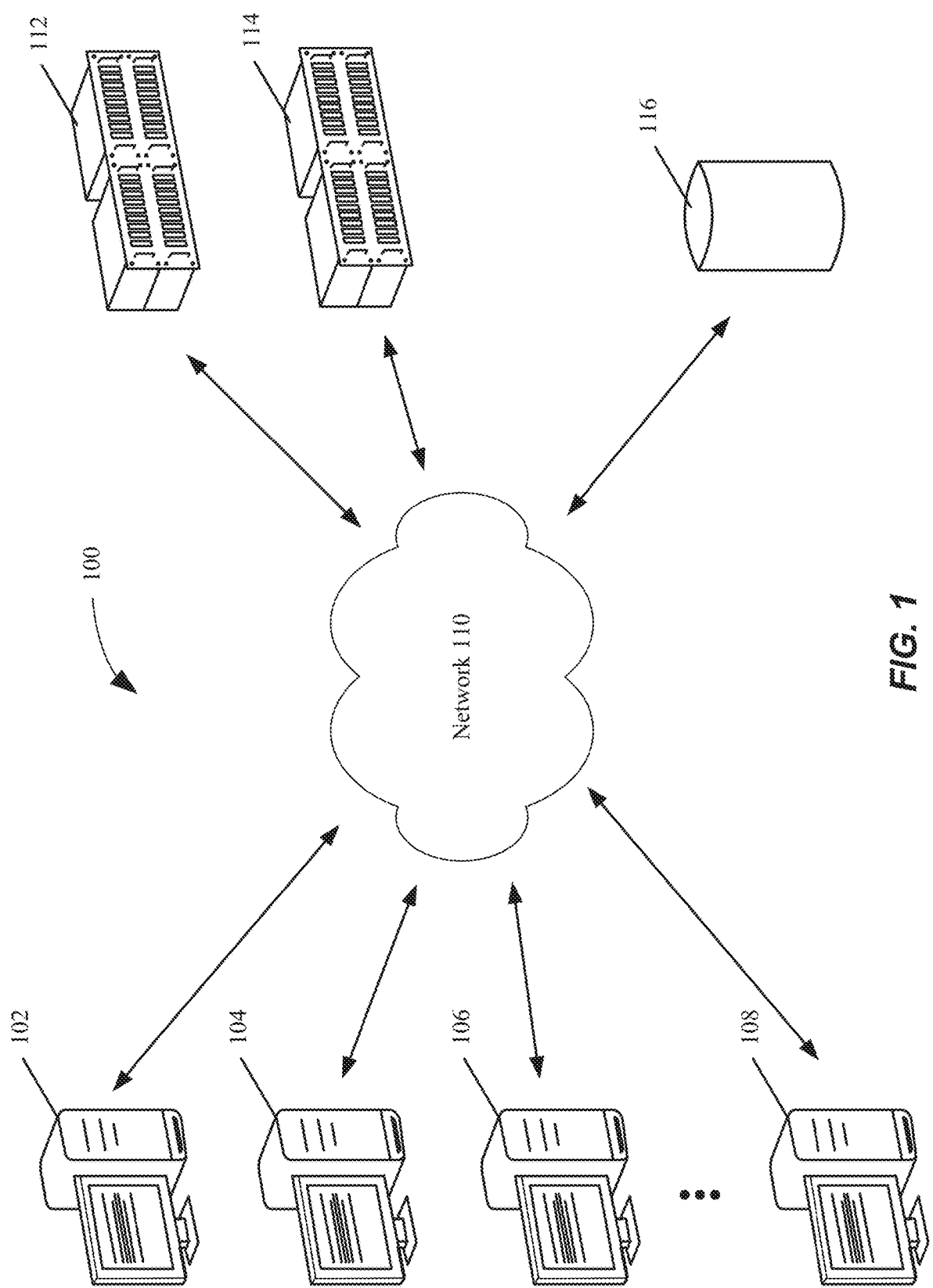
FIG. 1 illustrates a diagram of an example network architecture for implementing various systems and methods of the present disclosure, in accordance with one or more embodiments.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure will be described in the context of particular data points and profile information. However, it should be noted that the techniques of the present disclosure apply to various other types of network information. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

OVERVIEW

According to various embodiments, a system for dynamic network validation is provided. In various embodiments, the system includes one or more servers, one or more databases, and one or more client devices communicably connected over a network. The one or more client devices include a first client device corresponding to a first user and a second client device corresponding to a second user. In some embodiments, network profile information is stored at a server. In some embodiments, the network profile information is stored as a deserialized data structure. In some embodiments, the network profile information corresponds to a first network profile. In some embodiments, the first network profile is a dating profile of a first user on a social dating network and may include personality information and other personal attributes of the dater. In some embodiments, the first user grants permission to the second user to review and/or validate the network profile information.

Once the second client device is authenticated using various security protocols, the second user is authorized to view the network profile information and transmit validation information. The validation information is stored as an array of the deserialized data structure and the deserialized data structure is updated by aggregating the stored validation information with other previously stored validation information. In some embodiments, a first validated network profile is created by weighting the data of one or more stored validation information and integrating the weighted data based on predetermined protocols and criterion. In some embodiments, the first validated network profile is used to match with a second validated network profile. In further embodiments, only validated network profiles can be matched on the system.

Example Embodiments

FIG. 1 illustrates a diagram of an example network architecture 100 for implementing various systems and methods of the present disclosure, in accordance with one or more embodiments. The network architecture 100 includes a number of client devices 102-108 communicably connected to one or more server systems 112 and 114 by a network 110. In some embodiments, server systems 112 and 114 include one or more processors and memory. The processors of server systems 112 and 114 execute computer instructions (e.g., network computer program code) stored in the memory to perform functions of a network data exchange server.

In some embodiments, server system 112 is a content server configured to receive and store network profile information. In some embodiments server system 114 is a dispatch server configured to transmit and/or route network data packets including network messages. In some embodiments, the network architecture 100 may further include a database 116 communicably connected to client devices 102-108 and server systems 112 and 114 via network 110. In some embodiments, network data, or other information such as user information, may be stored in and/or retrieved from database 116.

Users of the client devices 102-108 access the server system 112 to participate in a network data exchange service. For example, the client devices 102-108 can execute web browser applications that can be used to access the network data exchange service. In another example, the client devices 102-108 can execute software applications that are specific to the network (e.g., networking data exchange "apps" running on smartphones).

Users interacting with the client devices 102-110 can participate in the network data exchange service provided by the server system 112 by distributing digital content, such as text comments (e.g., updates, announcements, replies), digital photos, videos, or other appropriate electronic information. In some implementations, information can be posted on a user's behalf by systems and/or services external to the network or the server system 112. For example, the user may post a review of a movie to a movie review website, and with proper permissions that website may cross-post the review to the network on the user's behalf. In another example, a software application executed on a mobile device, with proper permissions, may use global positioning system (GPS) capabilities to determine the user's location and automatically update the network with his location (e.g., "At Home", "At Work", "In San Francisco, Calif.").

In some implementations, the client devices 102-110 can be computing devices such as laptop or desktop computers, smartphones, personal digital assistants, portable media players, tablet computers, or other appropriate computing devices that can be used to communicate with an electronic social network. In some implementations, the server system 112 can include one or more computing devices such as a computer server. In some implementations, the server system 112 can represent more than one computing device working together to perform the actions of a server computer (e.g., cloud computing). In some implementations, the network 114 can be a public communication network (e.g., the Internet, cellular data network, dial up modems over a telephone network) or a private communications network (e.g., private LAN, leased lines).

Figure 2A:
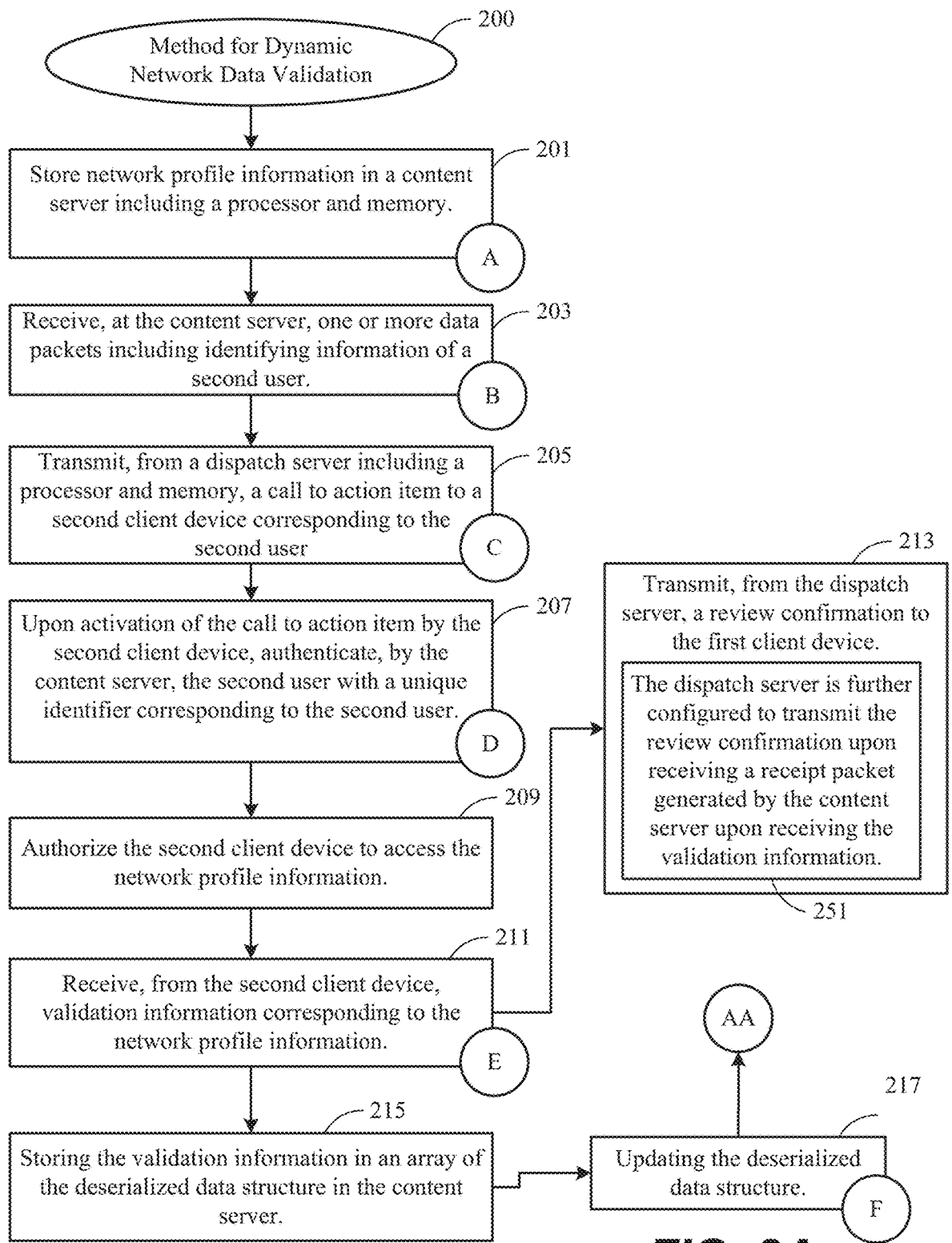
Figure 2C:
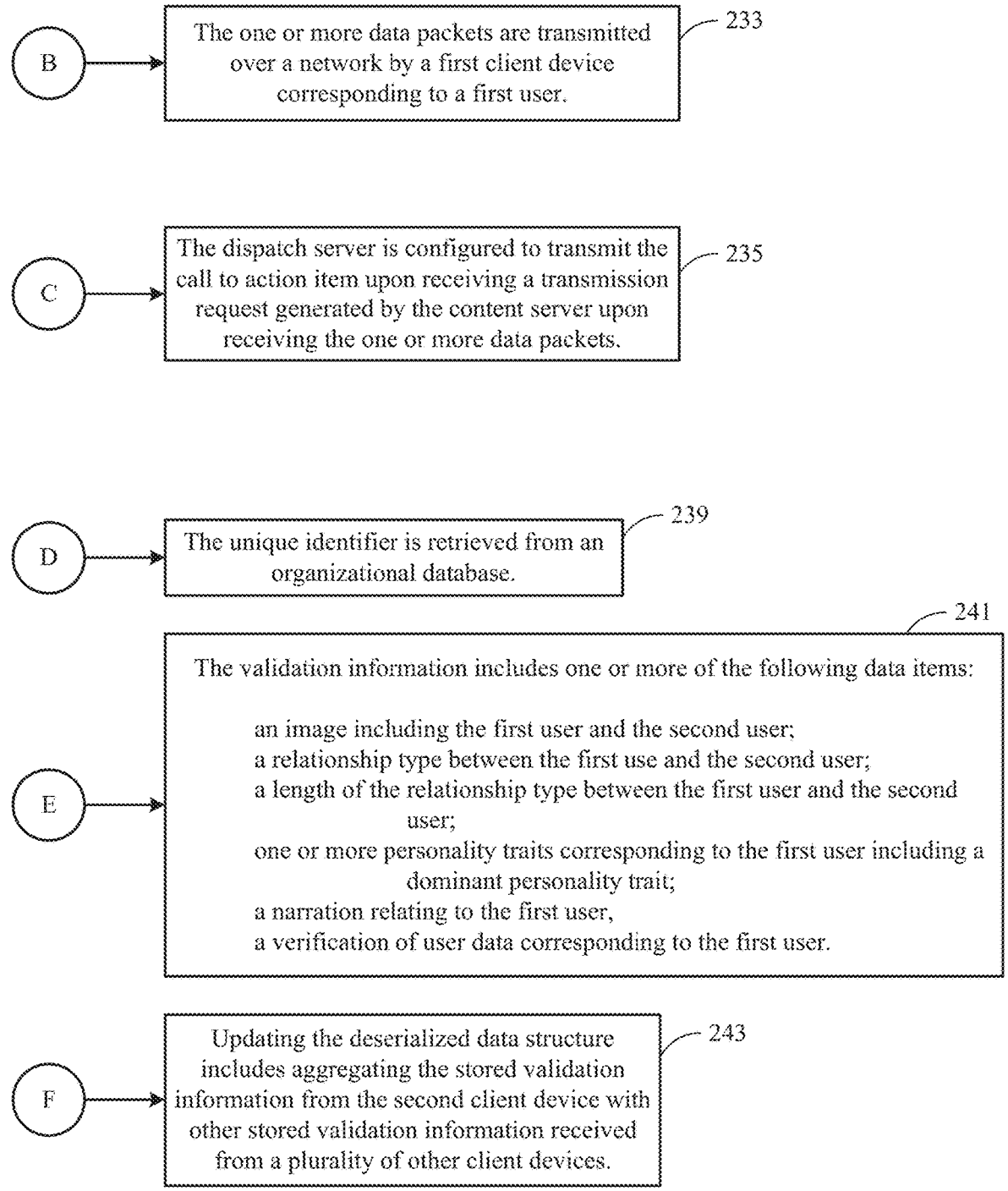

FIG. 2A, FIG. 2B, and FIG. 2C illustrate a method 200 for dynamic network data validation, in accordance with one or more embodiments. At step 201, network profile information 223 is stored in a content server including a processor and memory. In some embodiments, the content server is server 112, previously described in FIG. 1. In some embodiments, the network profile information 223 is stored as a deserialized data structure 221. In some embodiments the deserialized data structure 221 comprises any one of various data structures that provide a means to manage large amounts of data efficiently, such as arrays, associative arrays, trees, records, unions, tagged unions, sets, graphs, trees, classes, etc. Such data structures may be supported by high level assembly languages, such as Microsoft Macro Assembler (MASM), C, and Pascal languages. Other programming languages feature a library mechanism to allow data structures implementations to be reused by different programs, and/or support modular programming. Examples of programming languages include C++ Standard Template Library, Java Collections Framework, and Microsoft's .NET Framework. For example, the network profile information may be stored as a data tree that simulates a hierarchical tree structure, with a root value and subtrees of children with a parent node, represented as a set of linked nodes. In some embodiments, such data tree is formatted to work with JavaScript Object Notation (JSON). In other embodiments, such data tree is formatted to work with other programming languages described above.

In some embodiments, network profile information 223 corresponds to a first network profile. In some embodiments, the first network profile may be a user profile on a social networking service. In some embodiments, the first network profile may be a user profile on a data exchange service. For example, the first network profile may be a user profile included on a professional or business-oriented social network that includes employment history, education, skills, salary, and other related information. In other embodiments, the first network profile corresponds to other types of information besides personal user profiles. For example, the first network profile may be a business profile including information relevant to consumers, such as business hours, services rendered, pricing, photos, etc. As another example, the first network profile is a business profile including information relevant to investors, such as intellectual property owned, capital raised, etc. As another example, the first network profile is a lender and/or borrower profile including information concerning loans, such as interest rates, loan repayment history, etc.

In another example, the first network profile is a user profile of a dater on a social dating network that includes network profile information 223 comprising personality traits, photographs, background information, and other personal attributes. In some embodiments, the network profile is created from data, comprising the network profile information 223, that is entered and/or selected by the dater. In some embodiments, the system implements various protocols to generate the user profile of the dater based on various predetermined criteria, as further described in FIGS. 3A-3B below.

In some embodiments, the network profile information 223 comprises one or more personality traits 225 corresponding to the first user. In some embodiments, the one or more personality traits 225 may include positive personality traits, such as charming, clever, confident, considerate, courteous, curious, decisive, determined, easy-going, elegant, logical, loving, loyal, observant, open-minded, organized, passionate, personable, philosophical, playful, sophisticated, strong, suave, sweet, trusting, understanding, well-rounded, wise, witty, youthful, etc. In some embodiments, the one or more personality traits 225 may additionally, or alternatively, include neutral personality traits such as aggressive, blunt, clumsy, cocky, compassionate, competitive, conservative, demanding, dependent, dramatic, extravagant, frivolous, impulsive, independent, indulgent, opinionated, opportunistic, picky, perfectionist, private, protective, sarcastic, sensitive, serious, stoic, stubborn, wild, etc. In some embodiments, the one or more personality traits 225 may additionally, or alternatively, include other traits, including negative traits. In some embodiments, the one or more personality traits 225 includes a dominant personality trait 227. In some embodiments, the dominant personality trait 227 is selected from one of the one or more personality traits 225.

In some embodiments, the network profile information 223 additionally, or alternatively, comprises user data 229 corresponding to the first user. In some embodiments, the user data 229 includes one or more of the following attributes 231: age, gender, body type, height, location of residence, education history, occupation, number of children, personal interests, and religious beliefs. In other embodiments, other attributes 231 may additionally, or alternatively, be included, such as eye color, hair color, relationship status, salary, smoker/non-smoker, etc. In some embodiments, other attributes 231 may also include user preferences for gender, age, children, smoker/non-smoker, etc.

At step 203, one or more data packets 233 including identifying information of a second user are received at the content server. In some embodiments, the second user is a reviewer of the system. In some embodiments, the identifying information includes the second user's name, user name, email address, etc. In some embodiments, the identifying information includes a type relationship between the first user and the second user. For example, the identifying information may include a selection of family member, friend, or ex (corresponding to ex-boyfriend or ex-girlfriend). In some embodiments, data packets 233 corresponding to a seven-layer Open Systems Interconnection (OSI) model of computer networking and utilize standard protocols such as transmission control protocol (TCP) or user datagram protocol (UDP). In some embodiments, the one or more data packets 233 are transmitted over a network by a first client device corresponding to a first user. In some embodiments, the first user is the dater corresponding to the first network profile. In some embodiments, the network is network 110 and the first client device is a client device from client devices 102-108.

At step 205, a call to action item 235 is transmitted to a second client device from a dispatch server including a processor and memory. The second client device corresponds to the second user. In some embodiments, second client device is a client device, such as client device 102-108. In some embodiments, the dispatch server is server 114, previously described in FIG. 1. In some embodiments, the dispatch server is configured to transmit the call to action item 235 upon receiving a transmission request generated by the content server upon receiving the one or more data packets 233. In some embodiments, the transmission request is transmitted to the dispatch server via one or more data packets, similar to data packets 233, over a network, such as network 110. In some embodiments the call to action item 235 is a message, such as an email, that includes a hyperlink. A hyperlink is a reference to data that the reader can directly follow either by clicking or by hovering. A hyperlink may point to a whole document or to a specific element within a document. In some embodiments, the call to action includes hypertext including the hyperlink. In some embodiments, the call to action item 235 links to the network profile information 223 stored on the content server. In some embodiments, the call to action item 235 includes a prompt to the second user to activate the call to action item 235 via the second client device.

Upon activation of the call to action item 235 by the second client device, the second user is authenticated by the content server at step 207 with a unique identifier 239 corresponding to the second user. In some embodiments, activation of the call to action item 235 causes a log in page to be displayed at the second client device. In some embodiments, the unique identifier 239 is retrieved from an organizational database. In some embodiments, the organizational database is a database of a social networking system. In some embodiments, the unique identifier 239 is retrieved based on the identifying information included in data packets 233. In some embodiments, the log in page is specific to the second user based on the identifying information of the second user. In some embodiments, the second user is authenticated by entering the password corresponding to the unique identifier 239.

At step 209, the second client device is authorized to access the network profile information 223. In some embodiments, the network profile information 223 is displayed at the second client device. At step 211, validation information 241 corresponding to the network profile information 223 is received from the second client device. In some embodiments, the second user is prompted at the second client device to input the validation information 241. In some embodiments, the validation information 241 includes one or more of the following data items: an image including the first user and the second user, a relationship type between the first user and the second user, a length of the relationship type between the first user and the second user, one or more personality traits corresponding to the first user including a dominant personality trait, a narration relating to the first user, and a verification of the user data 229 corresponding to the first user.

In various embodiments, the image of the first user and the second user is a digital image file that is uploaded to the content server. In some embodiments, the image file includes metadata including the date the image was created and/or taken. In some embodiments, the relationship type between the first user and the second user is selected from among the following: friend, family and ex. In some embodiments, ex corresponds to an ex-boyfriend or ex-girlfriend. In some embodiments, the relationship type is preselected by data included in the identifying information of the second user included in data packets 233. In some embodiments, the length of the relationship type indicates how long the second user has known the first user. In some embodiments, the one or more personality traits corresponding to the first user are personality traits selected and/or entered by the second user. In some embodiments, the second user is prompted with a selection of personality traits, such as those previously listed. In other embodiments, the second user may enter descriptive personality traits. In some embodiments, a dominant trait is indicated by the second user from the selected and/or entered personality traits.

In some embodiments, the narration relating to the first user is a personal account and/or personal description of the first user created by the second user. In some embodiments, the narration includes one or more of the selected and/or entered personality traits. For example, the narration may describe how a selected personality trait is exemplified by an action taken by the first user. In some embodiments, the verification of the user data 229 includes a selection of True or False. For example, the user data 229 of the network profile information 223, including attributes 231, may be displayed at the second client device, and the second user is prompted to mark each presented attribute 231 as either True or False.

At step 213, a review confirmation 251 is transmitted to the first client device from the dispatch server. In some embodiments, the review confirmation 251 includes a message indicating that validation information was transmitted from the second client device. In some embodiments, the review confirmation 251 is transmitted via data packets over a network, such as network 110. In some embodiments, the dispatch server is further configured to transmit the review confirmation 251 upon receiving a receipt packet generated by the content server upon receiving the validation information 241. In some embodiments, the receipt packet is transmitted to the dispatch server via data packets from the content server over a network, such as network 110.

At step 215, the validation information 241 is stored in an array of the deserialized data structure 221 in the content server. An array is a data structure consisting of a collection of elements (values or variables), each identified by at least one array index or key. An array is stored so that the position of each element can be computed from its index tuple by a mathematical formula. In the previously described example of a data tree, an array can store the tree's data values efficiently, placing each data value in the array position corresponding to that node's position within the tree.

At step 217, the deserialized data structure 221 is updated. In some embodiments, updating the deserialized data structure 221 includes aggregating the stored validation information 241 from the second client device with other stored validation information 243 received from a plurality of other client devices. In some embodiments, the other stored validation information 243 is similarly stored as an array of the deserialized data structure 221 in the content server. In some embodiments, aggregation of the validation information 241 and other stored validation information 243 increases efficiency in accessing the data therein.

At step 219, one or more arrays corresponding to the aggregated stored validation information 241 are retrieved for input into an algorithm 245. In some embodiments, the algorithm 245 is configured to assign weighted scores to one or more data items of the validation information 241 based on predetermined criterion. In some embodiments, the algorithm 245 is configured to integrate the one or more weighted data items with the user data of the network profile information 223 based on predetermined protocols. In some embodiments, the one or more personality traits 225 and/or user data 229 of network profile information 223 is updated with the one or more weighted data items. In some embodiments, the output of the algorithm 243 is used to generate a first validated network profile 247. In some embodiments, the first validated network profile 247 reflects the updated network profile information. The operations of algorithm 245 are further explained below in conjunction with FIGS. 3A-3B. In some embodiments, information corresponding to the second user is displayed on the validated network profile 247. In some embodiments, such information includes a combination of one or more of the following, an image of the second user, contact information, relationship between the first user and the second user, length of relationship, other data items included in validation information 241, etc.

In some embodiments, the first validated network profile 247 is used to match with a second validated network profile 249. In some embodiments, the first validated network profile 247 can be matched with a second network profile only if the second network profile has been validated. In some embodiments, the second network profile corresponds to another dater of the social dating network. In some embodiments, a matching algorithm is implemented to determine a weighted match score between the first validated network profile 247 and the second validated network profile 249 based on predetermined criterion and/or protocols. In some embodiments, a weighted match score is determined between the first validated network profile 247 and other validated network profiles. In some embodiments, validated network profiles with a weighted match score above a predetermined value is presented to the first user of the system.

Figure 3A:
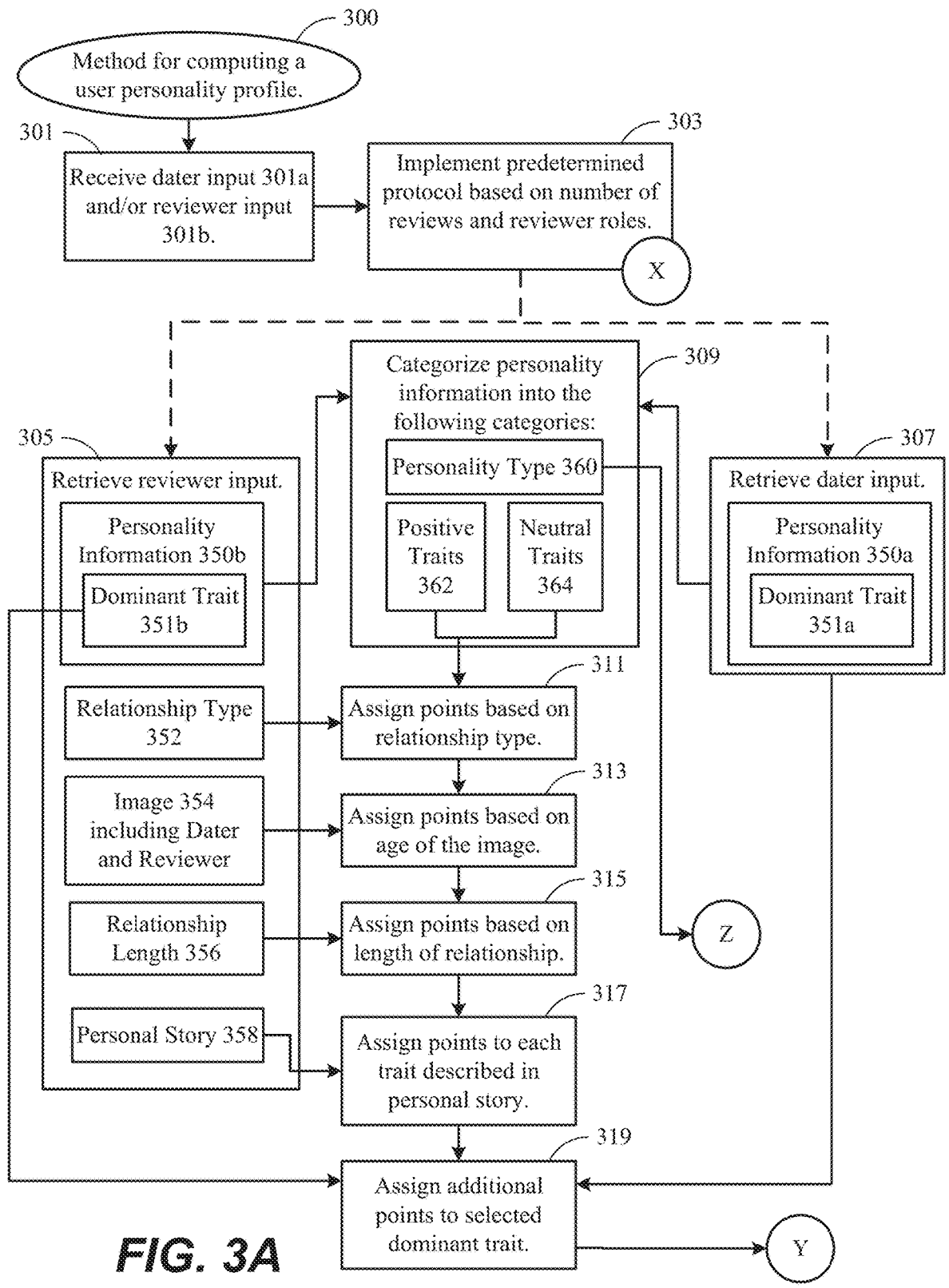
FIGS. 3A and 3B illustrate an example of a method for computing a personality profile, in accordance with one or more embodiments.
Figure 3B:
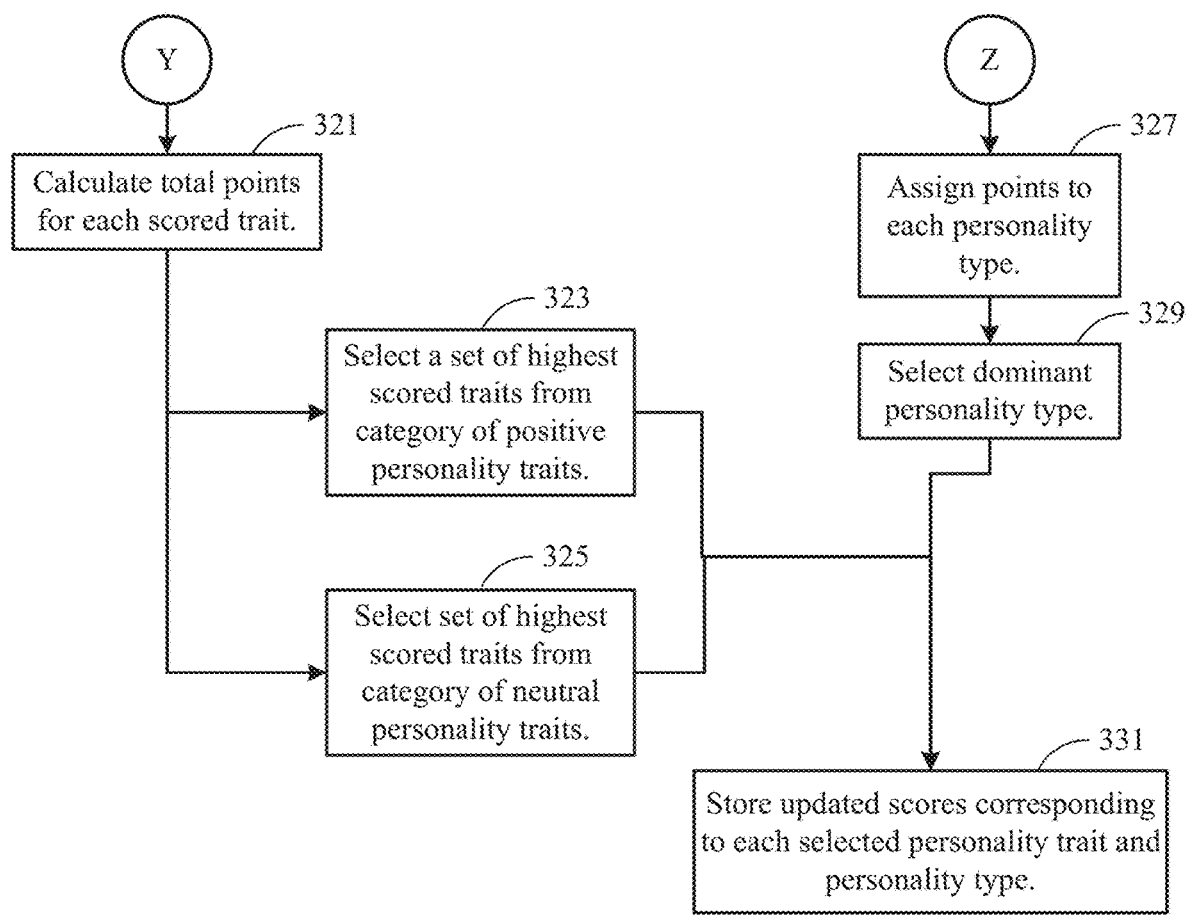

FIG. 3A and FIG. 3B illustrate an example of a method 300 for computing a user personality profile, in accordance with one or more embodiments of the present disclosure. In some embodiments, method 300 is implemented via an algorithm, such as algorithm 245, previously described in FIGS. 2A-2C. At step 301, dater input 301a and/or reviewer input 301b is received.

In various embodiments, the dater is the first user described in FIGS. 2A-2C. In some embodiments, dater input 301a includes network profile information, such as network profile information 223. In some embodiments, dater input 301a includes personality information 350a. In some embodiments personality information 350a includes personality traits, such as personality traits 225. In some embodiments, a personality trait corresponds to a habitual pattern of behavior, temperament, and/or emotion. In some embodiments, personality information 350a additionally, or alternatively, includes a personality type 360 corresponding to the dater. In some embodiments, a personality type corresponds to a collection of personality traits that occur together consistently. In some embodiments, a personality type 360 is a selection between extrovert, ambivert, or introvert. In some embodiments, other personality types 360 are included for selection.

In some embodiments, the personality traits selected by the dater include positive traits 362 and/or neutral traits 364 corresponding to the dater. In some embodiments, personality information 350a additionally, or alternatively, includes a dominant trait 351a. In some embodiments the dominant personality trait 351a is selected by the dater from a personality trait included in personality information 350a. As described in FIGS. 2A-2C, a dater is prompted to enter and/or select personality information 350a, including personality traits 225, to generate a user profile for a social dating network. In some embodiments, personality information 350a additionally includes a dominant personality trait 351a, such as dominant personality trait 227. In other embodiments, dater input 301a additionally, or alternatively, includes photographs, background information, and other personal attributes. As additionally described in FIGS. 2A-2C, the input received from the dater may be stored as a deserialized data structure 221 on a content server, such as server 112.

In some embodiments, a reviewer is another user of a social dating network. In some embodiments, the reviewer is a second user corresponding to the second client device, as described in FIGS. 2A-2C. As further described in FIGS. 2A-2C, the reviewer is authorized to access the network profile information 223, such as in step 209, and transmit validation information 241 corresponding to the network profile information 223, such as in step 211. In some embodiments, the reviewer input 301b is validation information, such as validation information 241, which may include an image including the first user and the second user, a length of relationship between the first user and the second user, a narration relating to the first user, and/or a verification of user data corresponding to the first user. In some embodiments, the reviewer input 301b includes personality information 350b. In some embodiments, personality information 350b includes data items, such as one or more personality traits corresponding to the first user (dater) included in validation information 241. In some embodiments, the one or more personality traits include positive traits 362 and/or neutral traits 364 corresponding to the dater. In some embodiments, personality information 350b additionally, or alternatively, includes a personality type 360. In some embodiments, personality information 350b additionally includes a dominant personality trait 351b. In some embodiments the dominant personality trait 351b is selected by the reviewer from a personality trait included in personality information 350b. In some embodiments, a dater and/or reviewer is prompted to select a predetermined number of positive traits 362 and neutral traits 364. In other embodiments, a dater and/or reviewer can select any number of positive traits 362 and neutral traits 364.

Reviewer input 301b further includes relationship type 352. In some embodiments, relationship type 352 indicates the type of relationship between the reviewer and the dater, such as family, friend, or ex (ex-girlfriend or ex-boyfriend, etc.), etc. Reviewer input 301b further includes an image 354 including the dater and the reviewer. In some embodiments, image 354 may include metadata or other input indicating the date the image was taken and/or created. Reviewer input 301b further includes the relationship length 356 indicating the length of the relationship type 352 between the reviewer and the dater. Reviewer input 301b further includes a personal story 358. In some embodiments, personal story 358 includes a personal narrative corresponding to the dater written by the reviewer, and may include the one or more personality information 350b. As additionally described in FIGS. 2A-2C, input received from the reviewer may be stored as an array of the deserialized data structure 221. As additionally described in FIGS. 2A-2C, the input received from the reviewer may be stored as an array of the deserialized data structure 221 on a content server, such as server 112. In some embodiments, reviewer input 301b is received from a plurality of reviewers and stored.

For example, dater input 301a is received from a dater, Dater A, and from two reviewers, Reviewer A and Reviewer B. Dater A has input two positive trait selections (charming and sweet), two neutral trait selections (competitive and perfectionist), and a personality type (extrovert). Dater A has indicated that Dater A's dominant personality trait is charming. Reviewer A has selected two positive trait selections (charming and determined), two neutral trait selections (private and sarcastic), and a personality type (extrovert). Reviewer A has indicated that Dater A's dominant personality trait is determined. Reviewer A has also indicated that her relationship type 352 to Dater A is a friend for a relationship length 356 of 10 years and 1 month. Reviewer A has uploaded an image 354 of Reviewer A and Dater A taken two years ago. Reviewer A has also included a personal story 358 describing how Dater A is charming. Reviewer B has selected three positive trait selections (charming, wise, and organized), two neutral trait selections (impulsive and sensitive), and a personality type (ambivert). Reviewer B has indicated that Dater A's dominant personality trait is sensitive. Reviewer B has also indicated that his relationship type 352 to Dater A is an ex-boyfriend for a relationship length 356 of 2 years and 6 months. Reviewer B has uploaded an image 354 of Reviewer B and Dater A taken 5 months ago. Reviewer B has not included a personal story 358 describing Dater A At step 303, a predetermined protocol is implemented based on the number of reviews and reviewer roles. In some embodiments, a first protocol is implemented if input from one, or less than one, reviewer is received, and no dater input corresponding to personality traits has been received. Under the first protocol method 300 does not compute dater's personality profile and ends. In some embodiments, a second protocol is implemented if input from one, or less than one, reviewer is received, and dater input corresponding to personality traits has been received. Under the second protocol, method 300 will compute dater's personality profile using only dater input 301a and retrieve dater input 301a at step 307. In some embodiments, a third protocol is implemented if input from more than one reviewer is received, and no dater input corresponding to personality traits has been received. Under the third protocol, method 300 will compute dater's personality profile using all defined reviewer input 301b and retrieve reviewer input 301b at step 305. In some embodiments, a fourth protocol is implemented if both input from more than one reviewer is received, and dater input corresponding to personality traits has been received. Under the fourth protocol, the method 300 will compute dater's personality profile using all defined reviewer input 301b and user input 301a, and retrieve reviewer input 301b and user input 301a and steps 305 and 307.

Based on the protocol implemented, reviewer input 301b is retrieved at step 305 and/or dater input 301a is retrieved at step 307. In the example above, the fourth protocol is implemented because dater input 301a was received from a dater, Dater A, and reviewer input 301b was received from two reviewers, Reviewer A and Reviewer B. Thus, reviewer input 301b is retrieved at step 305 and/or dater input 301a is retrieved at step 307. In some embodiments reviewer input 301b and/or dater input 301a is retrieved from storage within memory of a content server, such as the server 112.

Once retrieved, personality information 350a of dater input 301a and/or personality information 350b of reviewer input 301b are categorized at step 309. In some embodiments, the input personality types 360, positive traits 362, and neutral traits 364 are aggregated and grouped. In other embodiments, other categories may be grouped, such as negative traits. In steps 311 to 319, the positive and neutral personality traits are assigned weighted scores, as described in step 219 in FIGS. 2A-2C. Selected personality types 360 are scored in step 327. From the example above, the selected personality traits 360 include extrovert and ambivert. The positive traits 362 include charming, sweet, determined, wise, and organized. The neutral traits 364 include competitive, perfectionist, private, sarcastic, impulsive and sensitive.

At step 311, points are assigned to the positive traits 362 and neutral traits 364 based on relationship type 352. In some embodiments all personality trait selections by a dater is given 1.0 point. In some embodiments, relationship type 352 indicated as family or friend causes 1.0 point to be assigned to the positive traits 362 and neutral traits 364 selected by the reviewer. In some embodiments, a relationship type 352 indicated as ex causes 1.1 points to be assigned to the positive traits 362 and neutral traits 364 selected by the reviewer. In some embodiments, personality traits selected by exes are weighed more to give a higher significance to personality traits selected by reviewers who have previously dated the dater. In other embodiments, various different predetermined scores may be assigned based on relationship type 352. Table 1 shows the points assigned to each selected personality trait at step 311.

TABLE 1

| Positive Trait | Score | Neutral Trait | Score |
|---|---|---|---|
| Charming | 3.1 | Competitive | 1 |
| Sweet | 1 | Perfectionist | 1 |
| Determined | 1 | Private | 1 |
| Wise | 1.1 | Sarcastic | 1 |
| Organized | 1.1 | Impulsive | 1.1 |
| | | Sensitive | 1.1 |

In the above example, each trait selected by Dater A is assigned 1.0 point because those traits are selected in dater input 301a. Each trait selected by Reviewer A is assigned 1.0 point because the relationship type is friend. Because Reviewer B is indicated as an ex for relationship type 352, each trait selected by Reviewer B is assigned 1.1 points. Because Dater A, Reviewer A, and Reviewer B all selected charming as a personality trait, charming is assigned a total of 3.1 points.

At step 313, points are assigned to the positive traits 362 and neutral traits 364 based on the age of image 354. This scoring may be used to signify a higher weight for closeness of relationship between the reviewer and the dater. In some embodiments, 0.05 points are assigned to all selected personality traits if the image 354 was created within one year of the current date. In other embodiments, various different predetermined scores may be assigned based on age of image 354. Table 2 shows the points assigned to each selected personality trait at step 311.

TABLE 2

| Positive Trait | Score | Neutral Trait | Score |
|---|---|---|---|
| Charming | 0.05 | Competitive | 0 |
| Sweet | 0 | Perfectionist | 0 |
| Determined | 0 | Private | 0 |
| Wise | 0.05 | Sarcastic | 0 |
| Organized | 0.05 | Impulsive | 0.05 |
| | | Sensitive | 0.05 |

In the example above, scores are assigned based only on images submitted in reviewer input 301b. Both Reviewer A and Reviewer B input images 354. However, only the image 354 input by Reviewer B was taken less than one year ago. Thus, the positive traits 362 and neutral traits 364 selected by Reviewer B are assigned an additional 0.05 points each. All other traits are assigned 0 points.

At step 315, points are assigned to the positive traits 362 and neutral traits 364 based on the relationship length 356. This may be used to signify consistency of personality traits. In some embodiments, 0.05 points are assigned to all selected personality traits for an indicated relationship length 356 of 5 years or greater, but less than 10 years. In some embodiments 0.10 points are assigned to all selected personality traits for an indicated relationship length 356 of 10 years or greater, but less than 25 years. In some embodiments 0.20 points are assigned to all selected personality traits for an indicated relationship length 356 of 25 years or greater. In other embodiments, various different predetermined scores may be assigned based on relationship length 356. Table 3 shows the points assigned to each selected personality trait at step 311.

TABLE 3

| Positive Trait | Score | Neutral Trait | Score |
|---|---|---|---|
| Charming | 0.10 | Competitive | 0 |
| Sweet | 0 | Perfectionist | 0 |
| Determined | 0.10 | Private | 0.10 |
| Wise | 0 | Sarcastic | 0.10 |
| Organized | 0 | Impulsive | 0 |
| | | Sensitive | 0 |

In the example above, scores are assigned based only on indicated relationship length 356 in reviewer input 301b. Both Reviewer A and Reviewer B input relationship lengths 356. However, the relationship length 356 indicated by Reviewer B is less than 5 years, thus, traits selected by Reviewer B are not assigned any points. On the other hand, the relationship length 356 indicated by Reviewer A is greater than 10 years, thus, traits selected by Reviewer A are assigned 0.10 points each.

At step 317, points are assigned to the positive traits 362 and neutral traits 364 based on the personal story 358. In some embodiments, each personality trait described and/or mentioned within the personal story 358 is assigned an additional 0.01 points. In other embodiments, various different predetermined scores may be assigned based on personal story 358. Table 4 shows the points assigned to each selected personality trait at step 317.

TABLE 4

| Positive Trait | Score | Neutral Trait | Score |
|---|---|---|---|
| Charming | 0.01 | Competitive | 0 |
| Sweet | 0 | Perfectionist | 0 |

TABLE 4-continued

| Positive Trait | Score | Neutral Trait | Score |
| --- | --- | --- | --- |
| Determined | 0 | Private | 0 |
| Wise | 0 | Sarcastic | 0 |
| Organized | 0 | Impulsive | 0 |
|  |  | Sensitive | 0 |

In the example above, scores are assigned based only on whether a trait is included in the personal story 358 in reviewer input 301b. Only Reviewer A has a personal story 358 included in reviewer input 301b. Furthermore, the only personality trait included in the Reviewer A's personal story 358 is charming. Thus, 0.01 points is assigned to the personality trait charming.

At step 319, points are assigned to the positive traits 362 and neutral traits 364 based on the selected dominant trait 351a and/or 351b. In some embodiments, 0.25 points are assigned to the personality trait selected as the dominant trait 351a and/or 35 1b. In other embodiments, various different predetermined scores may be assigned based on the selected dominant trait 351a and/or 351b. Table 5 shows the points assigned to each selected personality trait at step 319.

TABLE 5

| Positive Trait | Score | Neutral Trait | Score |
| --- | --- | --- | --- |
| Charming | 0.25 | Competitive | 0 |
| Sweet | 0 | Perfectionist | 0 |
| Determined | 0.25 | Private | 0 |
| Wise | 0 | Sarcastic | 0 |
| Organized | 0 | Impulsive | 0 |
|  |  | Sensitive | 0.25 |

In the example above, scores are assigned based on indicated dominant trait 351a and 351b in user input 301a and reviewer input 301b, respectively. Dater A selected charming as the dominant trait 351a. Reviewer A selected determined as a dominant trait 351b. Reviewer B selected sensitive as a dominant trait 351b. Thus, 0.25 points are assigned to each of charming, determined, and sensitive.

At step 321, the total points for each scored trait are calculated. Table 6 shows the total points calculated each selected personality trait at step 321.

TABLE 6

| Positive Trait | Score | Neutral Trait | Score |
| --- | --- | --- | --- |
| Charming | 3.51 | Competitive | 1 |
| Sweet | 1 | Perfectionist | 1 |
| Determined | 1.35 | Private | 1.1 |
| Wise | 1.15 | Sarcastic | 1.1 |
| Organized | 1.15 | Impulsive | 1.15 |
|  |  | Sensitive | 1.35 |

At step 323, a set of the highest scored traits from the category of positive traits 362 is selected. At step 325, a set of the highest scored traits from the category of neutral traits 364 is selected. In some embodiments a set includes a predetermined number of personality traits. In some embodiments, the set of personality traits for positive traits 362 is a different amount than the set of personality traits for neutral traits 264. In other embodiments, the number of traits in a set of positive traits 362 is the same as the number of traits in a set of neutral traits 264. In an example, the system may select the three highest scored positive traits 362 and three highest scored neutral traits. In the above example, the highest scored positive trait 362 is charming, followed by determined. However, both wise and organized are equally scored. Additionally, the highest scored neutral traits 364 is sensitive, followed by impulsive. However, both sarcastic and private are equally scored.

In some embodiments, in order to complete the selection of personality traits at step 323 and/or step 325, a number of sub-protocols are implemented to serve as a tie-breaker in selecting the highest scored personality traits if one or more personality traits are equally scored. In some embodiments, a first sub-protocol allows dater input 350a to override for one or more personality traits that are equally scored. In some embodiments, a second sub-protocol allows reviewer input 350b of the reviewer with the longest indicated relationship length 356 to override for one or more personality traits that are equally scored. If a personality trait is still not able to be selected, the second sub-protocol then allows for reviewer input 350b of the reviewer with the most recent image 354 to override for one or more personality traits that are equally scored. In some embodiments, a third sub-protocol allows for a random personality trait of the equally scored personality traits to be selected. In other embodiments, other sub-protocols are implemented to select from highest scored personality traits that are equally scored.

In some embodiments, the system will iterate and select a set of superior dominants from the positive personality traits category until the total set of (3) is reached for both positive traits 362 and neutral traits 364. In some embodiments, if the total set has not been reached and there are too many highest scored personality traits equally present during the current iteration to fulfill the total set, the first sub-protocol is implemented only if dater input 301a includes the personality trait that is tied. If the dater input 301a is not viable to implement the first sub-protocol, the second sub-protocol is implemented until total set of (3) is reached. If a personality trait cannot be selected with the second sub-protocol, the third sub-protocol is implemented until total set of (3) is reached.

In the above example, both wise and organized were selected by Reviewer B. Thus, neither the first or second sub-protocols will result in a selected positive trait 362. The third sub-protocol is implemented to select a random positive trait 362 from wise and organized. In the above example, both private and sarcastic were selected by Reviewer A. Thus, neither the first or second sub-protocols will result in a selected positive trait 362. The third sub-protocol is implemented to select a random neutral trait 364 from private and sarcastic.

At step 327, the selected personality types 360 are assigned weighted scores. In some embodiments, 1.0 point is assigned to each personality type selected by each dater and reviewer. From the example above, the selected personality traits 360 include extrovert and ambivert. Extrovert was selected twice, once by Dater A and once by Reviewer A, and is assigned two points. Ambivert was selected once by Reviewer B and is assigned one point. At step 329 a dominant personality type is selected. In the above example, the dominant personality type 360 of Dater A is determined to be extrovert.

In some embodiments, in order to complete the selection of personality type 360 at step 329, a fourth sub-protocol is implemented to serve as a tie-breaker in selecting the highest scored personality type 360 if one or more personality types 360 are equally scored. In some embodiments, the fourth sub-protocol allows dater input 350a to override for one or more personality types 360 that are equally scored. For example, if two reviewers had selected extrovert, two other reviewers had selected introvert, and a dater had selected ambivert, the selections of personality type 360 from reviewer input 350*b* would be tied for extrovert and introvert. In this present example, the fourth sub-protocol would be implemented to allow the dater selection of ambivert in dater input 301*a* to override the equally scored personality types 360 selected in reviewer input 350*b*. In other embodiments, other protocols may be implemented to select from highest scored personality types 360 that are equally scored.

In some embodiments, method 300 is implemented each time user input 301*a* or reviewer input 301*b* is received at step 301. In some embodiments, reviewer input 301*b* is received for up to a predetermined number of unique reviewers. For example, reviewer input 301*b* may be received for up to ten different reviewers.

In some embodiments, a reviewed dating profile corresponding to Dater A, such as validated network profile 247, is generated as described in FIGS. 2A-2C. In some embodiments, the reviewed dating profile displays the selected sets of positive traits 362, neutral traits 364, and personality type 360. Thus in the above example, the reviewed dating profile of Dater A may display the following personality traits charming, determined, organized, sensitive, impulsive, and sarcastic. The reviewed dating profile of Dater A may further display a extrovert personality type. In some embodiments, information corresponding to reviewers is also displayed on the reviewed dating profile. As previously described, such information corresponding to reviewers includes a combination of one or more of the following: an image of the second user, contact information, relationship between the first user and the second user, length of relationship, other data items included in validation information 241, etc. In various embodiments, other methods and/or algorithms may additionally, or alternatively, be implemented to evaluate validation information 241 for integration with network profile information 223.

FIG. 4 illustrates one example of a system 400 for dynamic network data validation, in accordance with one or more embodiments. In some embodiments, system 400 is a client device, such as client device 102-108. In other embodiments, system 400 is a server device, such as server 112 and/or server 114. In some embodiments, the server device is a content server and/or a dispatch server, as described in FIGS. 2A-2C. In an alternative embodiment, the content server and dispatch server comprise a single server device in system architecture 100 that is configured to perform the operations of both servers.

According to particular embodiments, a system 400, suitable for implementing particular embodiments of the present disclosure, includes a processor 401, a memory 403, an interface 411, and a bus 415 (e.g., a PCI bus or other interconnection fabric) and operates as a streaming server. In some embodiments, when acting under the control of appropriate software or firmware, the processor 401 is responsible for processing inputs through various computational layers and algorithms to extract condition information from images and other data. In other embodiments, the processor 401 is responsible for transmitting and/or receiving one or more data packets (as in steps 203, 205, 211, and 213), authenticate one or more user devices (as in step 207), authorize one or more client devices to access data (as in step 209), update and/or integrate stored data (as in step 217), retrieve data from memory (as in step 219), implement a weighting algorithm (such as algorithm 245), and/or generating a transmission request and/or receipt packet. In other embodiments, the processor 401 is additionally, or alternatively, responsible for transmitting a call to action item (as in step 205) and/or transmitting a review confirmation (as in step 203). Various specially configured devices can also be used in place of a processor 401 or in addition to processor 401.

The interface 411 is typically configured to send and receive data packets or data segments over a network, such as network 104. Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 400 uses memory 403 to store data and program instructions. In some embodiments data stored in memory 403 comprises an organizational database, such as database 116, of unique identifiers corresponding to user profiles. In some embodiments, data stored in memory 403 additionally, or alternatively, includes network profile information 223, validation information 241, and/or other stored validation information 243. In some embodiments, the stored program instructions include program instructions for operations including storing network profile information 223, such as in step 201, receiving one or more data packets 233, such as in step 203, transmitting a call to action item 235, such as in step 205, authenticate a user with a corresponding unique identifier 239, such as in step 207, authorize a client device to access network profile information 223, such as in step 209, receive validation information 241, such as in step 211, transmit a review confirmation, such as instep 213, storing validation information 241 in an array of a data structure, such as in step 215, and/or updating a deserialized data structure, such as in step 217. In some embodiments, the stored program instructions additionally, or alternatively, include program instructions for operations including assigning weighted scores to one or more data items of the validation information based on predetermined criterion, integrating the one or more weighted data items with the user data of the network profile information based on predetermined protocols, and/or aggregating the stored validation information 241 with other stored validation information 243 received from a plurality of other client devices. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, or non-transitory, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 5:
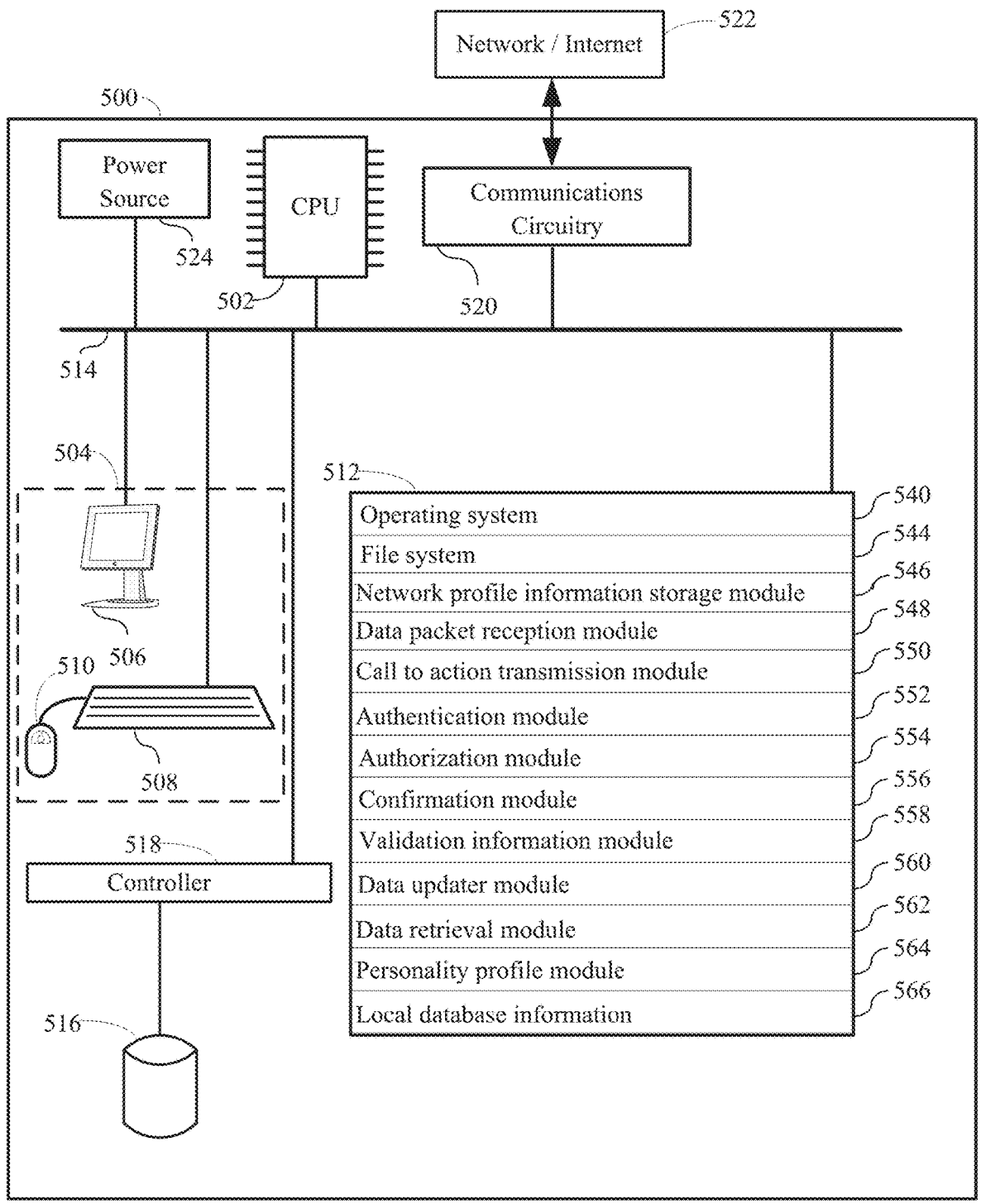
FIG. 5 is a block diagram illustrating an example of a computer system capable of implementing various processes described in the present disclosure.

FIG. 5 is a block diagram illustrating an example of a computer system 500 capable of implementing various processes described in the present disclosure. The system 500 typically includes a power source 524; one or more processing units (CPU's) 502 for executing modules, programs and/or instructions stored in memory 512 and thereby performing processing operations; one or more network or other communications circuitry or interfaces 520 for communicating with a network 522; controller 518; and one or more communication buses 514 for interconnecting these components. In some embodiments, network 522 can be the another communication bus, the Internet, an Ethernet, an Intranet, other wide area networks, local area networks, and metropolitan area networks. Communication buses 514 optionally include circuitry (sometimes called a chipset) that interconnects and controls communications between system components. System 500 optionally includes a user interface 504 comprising a display device 506, a keyboard 508, and a mouse 510. In some embodiments, display device 506 may be a touchscreen for displaying and/or inputting information. In some embodiments, system 500 is a server device, such as servers 110 and/or 112. In an alternative embodiment, system 500 is a server device, such as content server 110 and/or dispatch server 112. In an alternative embodiment, the content server 110 and dispatch server 112 is configured in a single system 500 that is configured to perform the operations of both servers.

Memory 512 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 512 may optionally include one or more storage devices 516 remotely located from the CPU(s) 502. In some embodiments data stored in one or more storage devices 516 comprise an organizational database, such as database 116, of unique identifiers corresponding to user profiles.

Memory 512, or alternately the non-volatile memory device(s) within memory 512, comprises a non-transitory computer readable storage medium. In some embodiments, memory 512, or the computer readable storage medium of memory 512 stores the following programs, modules and data structures, or a subset thereof:
- an operating system 540 that includes procedures for handling various basic system services and for performing hardware dependent tasks;
- a file system 544 for storing various program files;
- a network profile information storage module 546 for receiving and storing network profile information, such as network profile information 223;
- a data packet reception module 548 for receiving one or more data packets, such as data packets 233;
- a call to action transmission module 550 for generating and/or transmitting a transmission request and/or call to action item 235;
- an authentication module 552 for authenticating client devices, such as the second client device, based on a unique identifier 239 retrieved from an organizational database, such as an organizational database stored on one or more storage devices 516;
- an authorization module 554 for authorizing a client device, such as the second client device, to access network profile information 223;
- a confirmation module 556 for generating and/or transmitting a receipt packet and/or review confirmation to a client device, such as the first client device;
- a validation information module 558 for receiving validation information 241 from a client device, such as the second client device, and storing such validation information 241 in memory, such as storage device 516;
- a data updater module 560 for updating a deserialized data structure, such as in step 217;
- a data retrieval module 552 for retrieving aggregated stored validation information 241, such as in step 219;
- a personality profile module 564 for computing a user personality profile, such as in method 300, by an algorithm, such as algorithm 243; and
- local database information 566 comprising network profile information 223 and other user information.

Each of the above identified elements may be stored in one or more of the previously mentioned memory devices, and corresponds to a set of instructions for performing a function described above. One or more of the above identified modules my operate by retrieving input from one or more client devices and/or one or more local storage 516 or other databases on network 522, such as database 116. The above identified modules or programs (i.e., sets of instructions) need not be implemented as separate software programs, procedures or modules, and thus various subsets of these modules may be combined or otherwise re-arranged in various embodiments. In some embodiments, memory 512 may store a subset of the modules and data structures identified above. Furthermore, memory 512 may store additional modules and data structures not described above.

Although FIG. 5 shows a "system dynamic network data validation," FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement a presentation generation system and how features are allocated among them will vary from one implementation to another, and may depend in part on the amount of data traffic that the system must handle during peak usage periods as well as during average usage periods.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

What is claimed is:

1. A system for dynamic network data validation, the system comprising:
   a content server including a processor and memory, the content server configured to store network profile information of a first user corresponding to a first network profile, wherein the network profile information comprises one or more personality traits, one or more physical attributes, or one or more user attributes corresponding to the first user, wherein the network profile information is stored as a deserialized data structure in the content server;
a first client device, corresponding to the first user, configured to transmit one or more data packets to the content server over a network, wherein the one or more data packets include identifying information of a second user, the second user having a type of relationship to the first user;
a dispatch server including a processor and memory, the dispatch server configured to transmit a call to action item in response to a transmission request from the content server, wherein the content server generates the transmission request upon receiving the one or more data packets;
a second client device, corresponding to the second user, configured to receive the call to action item;
an organizational database configured to provide a unique identifier corresponding to the second user in response to activation of the call to action item by the second client device, wherein the unique identifier is used to authenticate the second user upon activation of the call to action item;
wherein, the content server is further configured to:
upon authentication of the second user,
authorize the second client device to access the network profile information of the first user; and
receive, from the second client device, validation information corresponding to the network profile information of the first user, the validation information representing whether or not the second user can verify that the network profile information of the first user is correct, wherein the validation information also includes one or more of the following data items: an image including the first user and the second user, a relationship type between the first user and the second user, a length of the relationship type between the first user and the second user, one or more personality traits corresponding to the first user including a dominant personality trait, and a narration relating to the first user;
store the validation information in an array of the deserialized data structure in the content server; and
update the deserialized data structure, wherein updating the deserialized data structure includes aggregating the stored validation information from the second client device with other stored validation information received from a plurality of other client devices.

2. The system of claim 1, wherein the dispatch server is further configured to transmit a review confirmation to the first client device upon receiving a receipt packet, wherein the content server generates the receipt packet upon receiving the validation information.

3. The system of claim 1, wherein the network profile information comprises:
one or more personality traits corresponding to the first user, the one or more personality traits including a dominant personality trait; and
user data corresponding to the first user, wherein the user data includes one or more of the following attributes: age, gender, body type, height, location of residence, education history, occupation, number of children, personal interests, and religious beliefs.

4. The system of claim 3, wherein the validation information includes one or more of the following data items:
an image including the first user and the second user;
a relationship type between the first user and the second user;
a length of the relationship type between the first user and the second user;
one or more personality traits corresponding to the first user, the one or more personality traits including a dominant personality trait;
a narration relating to the first user;
a verification of the user data corresponding to the first user.

5. The system of claim 1, wherein the content server is further configured to retrieve one or more arrays corresponding to the aggregated stored validation information for input into an algorithm, wherein the output of the algorithm is used to generate a first validated network profile.

6. The system of claim 5, wherein the algorithm is configured to:
assign weighted scores to one or more data items of the validation information based on predetermined criterion; and
integrate the one or more weighted data items with the user data of the network profile information based on predetermined protocols.

7. The system of claim 5, wherein the first validated network profile is used to match with a second validated network profile, wherein the first validated network profile can be matched with a second network profile only if the second network profile has been validated.

8. A method for dynamic network data validation, the method comprising:
storing network profile information of a first user as a deserialized data structure in a content server, the network profile information corresponding to a first network profile, wherein the network profile information comprises one or more personality traits, one or more physical attributes, or one or more user attributes corresponding to the first user, wherein the content server includes a processor and memory;
receiving, at the content server, one or more data packets including identifying information of a second user, the second user having a type of relationship to the first user, wherein the one or more data packets are transmitted over a network by a first client device corresponding to the first user;
transmitting, from a dispatch server including a processor and memory, a call to action item to a second client device corresponding to the second user, wherein the dispatch server is configured to transmit the call to action item upon receiving a transmission request generated by the content server upon to receiving the one or more data packets;
upon activation of the call to action item by the second client device, authenticating, by the content server, the second user with a unique identifier, corresponding to the second user, retrieved from an organizational database;
authorizing the second client device to access the network profile information;
receiving, from the second client device, validation information corresponding to the network profile information of the first user, the validation information representing whether or not the second user can verify that the network profile information of the first user is correct, wherein the validation information also includes one or more of the following data items: an image including the first user and the second user, a relationship type between the first user and the second user, a length of the relationship type between the first user and the second user, one or more personality traits corresponding to the first user including a dominant personality trait, and a narration relating to the first user;

storing the validation information in an array of the deserialized data structure in the content server; and updating the deserialized data structure, wherein updating the deserialized data structure includes aggregating the stored validation information from the second client device with other stored validation information received from a plurality of other client devices.

9. The method of claim 8, further comprising transmitting, by the dispatch server, a review confirmation to the first client device, wherein the dispatch server is further configured to transmit the review confirmation upon receiving a receipt packet generated by the content server upon receiving the validation information.

10. The method of claim 8, wherein the network profile information comprises:
one or more personality traits corresponding to the first user, the one or more personality traits including a dominant personality trait; and
user data corresponding to the first user, wherein the user data includes one or more of the following attributes: age, gender, body type, height, location of residence, education history, occupation, number of children, personal interests, and religious beliefs.

11. The method of claim 10, wherein the validation information includes one or more of the following data items:
an image including the first user and the second user;
a relationship type between the first user and the second user;
a length of the relationship type between the first user and the second user;
one or more personality traits corresponding to the first user, the one or more personality traits including a dominant personality trait;
a narration relating to the first user;
a verification of the user data corresponding to the first user.

12. The method of claim 8, further comprising retrieving one or more arrays corresponding to the aggregated stored validation information for input into an algorithm, wherein the output of the algorithm is used to generate a first validated network profile.

13. The system of claim 12, wherein the algorithm is configured to:
assign weighted scores to one or more data items of the validation information based on predetermined criterion; and
integrate the one or more weighted data items with the user data of the network profile information based on predetermined protocols.

14. The method of claim 12, wherein the first validated network profile is used to match with a second validated network profile, wherein the first validated network profile can be matched with a second network profile only if the second network profile has been validated.

15. A non-transitory computer readable medium comprising one or more programs configured for execution by a computer system, the one or more programs including instructions for:
storing network profile information of a first user as a deserialized data structure in a content server, the network profile information corresponding to a first network profile, wherein the network profile information comprises one or more personality traits, one or more physical attributes, or one or more user attributes corresponding to the first user, wherein the content server includes a processor and memory;

receiving, at the content server, one or more data packets including identifying information of a second user, the second user having a type of relationship to the first user, wherein the one or more data packets are transmitted over a network by a first client device corresponding to the first user;

transmitting, from a dispatch server including a processor and memory, a call to action item to a second client device corresponding to the second user, wherein the dispatch server is configured to transmit the call to action item upon receiving a transmission request generated by the content server upon receiving the one or more data packets;

upon activation of the call to action item by the second client device, authenticating, by the content server, the second user with a unique identifier, corresponding to the second user, retrieved from an organizational database;

authorizing the second client device to access the network profile information;

receiving, from the second client device, validation information corresponding to the network profile information of the first user, the validation information representing whether or not the second user can verify that the network profile information of the first user is correct, wherein the validation information also includes one or more of the following data items: an image including the first user and the second user, a relationship type between the first user and the second user, a length of the relationship type between the first user and the second user, one or more personality traits corresponding to the first user including a dominant personality trait, and a narration relating to the first user;

storing the validation information in an array of the deserialized data structure in the content server; and updating the deserialized data structure, wherein updating the deserialized data structure includes aggregating the stored validation information from the second client device with other stored validation information received from a plurality of other client devices.

16. The non-transitory computer readable medium of claim 15, wherein the network profile information comprises:
one or more personality traits corresponding to the first user, the one or more personality traits including a dominant personality trait; and
user data corresponding to the first user, wherein the user data includes one or more of the following attributes: age, gender, body type, height, location of residence, education history, occupation, number of children, personal interests, and religious beliefs.

17. The non-transitory computer readable medium of claim 16, wherein the validation information includes one or more of the following data items:
an image including the first user and the second user;
a relationship type between the first user and the second user;
a length of the relationship type between the first user and the second user;

one or more personality traits corresponding to the first user, the one or more personality traits including a dominant personality trait;

a narration relating to the first user;

a verification of the user data corresponding to the first user.

18. The non-transitory computer readable medium of claim 15, further comprising instructions for retrieving one or more arrays corresponding to the aggregated stored validation information for input into an algorithm, wherein the output of the algorithm is used to generate a first validated network profile.

19. The non-transitory computer readable medium of claim 18, wherein the algorithm is configured to:

assign weighted scores to one or more data items of the validation information based on predetermined criterion; and integrate the one or more weighted data items with the user data of the network profile information based on predetermined protocols.

20. The non-transitory computer readable medium of claim 18, wherein the first validated network profile is used to match with a second validated network profile, wherein the first validated network profile can be matched with a second network profile only if the second network profile has been validated.

* * * * *